United States Patent
Tenra

(10) Patent No.: US 7,638,181 B2
(45) Date of Patent: Dec. 29, 2009

(54) VACUUM HEAT INSULATOR AND HOT INSULATION/COLD INSULATION APPARATUS INCORPORATING THE VACUUM INSULATOR

(75) Inventor: Tomohisa Tenra, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/595,081

(22) PCT Filed: Feb. 2, 2005

(86) PCT No.: PCT/JP2005/001874

§ 371 (c)(1),
(2), (4) Date: Nov. 3, 2008

(87) PCT Pub. No.: WO2005/075878

PCT Pub. Date: Aug. 18, 2005

(65) Prior Publication Data

US 2006/0234006 A1    Oct. 19, 2006

(30) Foreign Application Priority Data

Feb. 4, 2004    (JP) .............................. 2004-027650
Mar. 23, 2004    (JP) .............................. 2004-084381

(51) Int. Cl.
*F16L 59/065*    (2006.01)
*B32B 1/06*    (2006.01)

(52) U.S. Cl. ......................................... 428/69; 312/406

(58) Field of Classification Search .................. 428/69; 312/406

See application file for complete search history.

(56) References Cited

U.S. PATENT DOCUMENTS 3,523,803 A * 8/1970 Haslay et al. .................. 501/38
4,537,820 A    8/1985 Nowobilski et al.

(Continued)

FOREIGN PATENT DOCUMENTS

JP    S59/225275 A    12/1984
JP    H7/139691 A    5/1995

(Continued)

OTHER PUBLICATIONS

International Search Report of PCT/JP2005/001874.
International Search Report of PCT/JP2005/001874, May 2005.

(Continued)

*Primary Examiner*—Alexander Thomas
(74) *Attorney, Agent, or Firm*—RatnerPrestia

(57) ABSTRACT

A vacuum heat insulator has a core formed of a glass fiber laminated body where glass fibers are laminated in the thickness direction, and an enveloping member that covers the core and has gas barrier property. The inside of the enveloping member is evacuated and the enveloping member is sealed. The core is pressurized and molded and the glass fibers are drawn by heat deformation of the glass fibers at a temperature at which the glass fibers start to slightly deform due to own weight of the glass fibers or a temperature at which the glass fibers become deformable due to a vertical load in pressing and the sectional shapes of the glass fibers do not significantly vary. Additionally, the shape of the core is kept by entanglement of parts of the glass fibers instead of binding of the glass fibers.

5 Claims, 5 Drawing Sheets

U.S. PATENT DOCUMENTS

| | | | |
|---|---|---|---|
| 5,330,816 A | | 7/1994 | Rusek, Jr. |
| 5,591,505 A | | 1/1997 | Rusek |
| 5,609,934 A | * | 3/1997 | Fay .............................. 428/74 |
| 6,034,014 A | * | 3/2000 | Rapp et al. .................... 501/35 |
| 2002/0167105 A1 | | 11/2002 | Jung |

FOREIGN PATENT DOCUMENTS

| | | |
|---|---|---|
| JP | H7/167376 A | 7/1995 |
| JP | 2000-097389 | 4/2000 |
| JP | 2004-011709 | 1/2004 |
| JP | 2004/011755 A | 1/2004 |
| WO | WO 01/85445 A1 | 11/2001 |

OTHER PUBLICATIONS

Supplementary European Search Report for Application No. EP 05 70 9926, Oct. 2, 2009, Panasonic Corporation.

* cited by examiner

VACUUM HEAT INSULATOR AND HOT INSULATION/COLD INSULATION APPARATUS INCORPORATING THE VACUUM INSULATOR

TECHNICAL FIELD

The present invention relates to a vacuum heat insulator, a method of manufacturing it, a hot-insulation cold-insulation apparatus having the vacuum heat insulator, and a heat insulation board.

BACKGROUND ART

Recently, energy saving has been desired for preventing global warming as an important global environmental issue, and the energy saving of a household appliance has been also promoted. Especially, a refrigerator-freezer requires a heat insulator having high insulating property in terms of efficient use of cold.

As a heat insulator of high performance, a vacuum heat insulator is used, which has a core formed of a porous body and an enveloping member. The core is covered by the enveloping member, inside of which is evacuated, and sealed. As the core of the vacuum heat insulator, generally, powder material, fiber material, or communicated foam is used. However, a vacuum heat insulator of higher insulation performance is required.

The heat transfer mechanism of the heat insulator is generally produced by heat conduction, radiation, or convection of a solid component and a gas component. Since the inside of the enveloping member is evacuated in the vacuum heat insulator, the heat conduction and convection of the gas component produce only a little effect on the heat transfer mechanism. When the heat transfer mechanism is used in a region of normal temperature or lower, the radiation also hardly contributes to it. It is therefore important to suppress the heat conduction of the solid component in the vacuum heat insulator that is applied to a refrigerator-freezer at normal temperature or lower. Thus, as the core for the vacuum heat insulator of high insulation performance, various fiber materials are reported.

Japanese Translation of PCT Publication No. H11-506708, for example, discloses a vacuum heat insulator having a core where thermoplastic inorganic binder material such as low-melting glass composition or boric acid is dispersed in the whole fibrous material. FIG. 7 is an enlarged schematic diagram showing an intersection point of cores used in this vacuum heat insulator. Two adjacent glass fibers 71 and 72 form binding part 74 at intersection point 73 using the inorganic binder material. Individual fibers of a fiber assembly are thus integrated. Examples of such products include a blanket made of electrical insulation material, a mat made of electrical insulation material, and a heat insulator. The inorganic binder material generates few gas components under vacuum in the enveloping member, unlike a general-purpose resin binder. The degradation over time in the heat insulation performance of the inorganic binder material is thus small.

In the structure described above, the binder bound at the intersection point of the inorganic fibers works as a binding material. The solidifying binder works as a thermal cross-link in binding part 74, thereby increasing the heat conduction in the heat insulation direction. In other words, the heat conductivity of the vacuum heat insulator is higher than that of a core that is made of a fiber body having no binding region of a binder or an eluting component.

In the fiber body having no binding region of a binder or an eluting component, the heat conductivity of the solid component is low. However, the fiber body lies in a bulky cotton state, and hence is extremely difficult to handle. When this fiber body is used as the core of the vacuum heat insulator, the external surface property is damaged by compression by atmosphere.

SUMMARY OF THE INVENTION

A vacuum heat insulator of the present invention has a core formed of a glass fiber laminated body where glass fibers are laminated in the thickness direction, and an enveloping member that covers the core and has gas barrier property. The inside of the enveloping member is evacuated and sealed. The core is pressurized and molded and the glass fibers are drawn by their heat deformation at the following temperature:
 a temperature at which the glass fibers start to slightly deform due to their own weight; or
 a temperature at which the glass fibers become deformable due to a vertical load in pressing and the sectional shapes of the glass fibers do not significantly vary.

Additionally, the shape of the core is kept by entanglement of parts of the glass fibers instead of binding of the glass fibers.

Since the glass fiber laminated body where the parts of the glass fibers become entangled with each other is pressurized and molded at the above-mentioned temperature, the glass fibers soften and thermally deform in the pressurized state. When the heating temperature is then decreased, the shape of the glass fiber assembly at the pressurizing and molding time is kept because the elasticity of the glass fiber assembly is lower than that before the molding. Therefore, the core made of the glass fiber assembly can be kept in a predetermined shape even when no binding material lies between fibers. In other words, in the vacuum heat insulator of the present invention, the core is formed without disposing, between the glass fibers, the binding material that is made of the binder component or the component eluting from the fibers. The binding material made of the binder component or the component eluting from the fibers therefore does not exist at the intersection point of the fibers. Since the binding region which conventionally works as a thermal cross-link does not exist, the number of heat transfer points between the fibers significantly decreases, and the heat transfer amount is suppressed. The fibers can be expected to be drawn by the heat deformation of the glass fiber assembly in heating and pressing, so that the lamination arrangement of the glass fibers is further improved. Therefore, the heat resistance between the fibers is increased to improve the heat insulation performance. As a result, the vacuum heat insulator of the present invention has a greatly improved heat insulation performance.

DETAILED DESCRIPTION OF PREFERRED EMBODIMENTS

Figure 1:
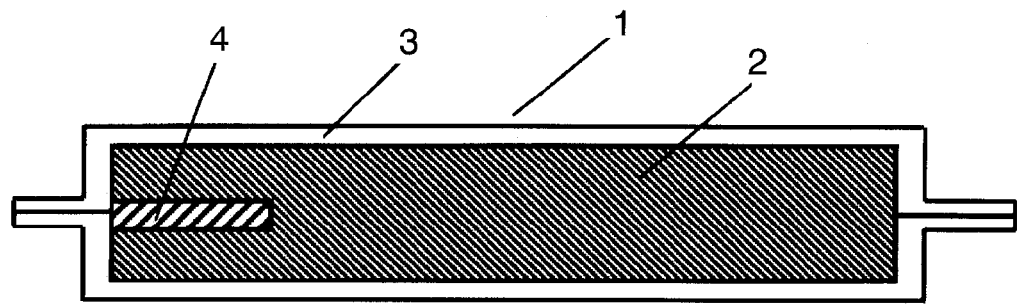
FIG. 1 is a sectional view of a vacuum heat insulator in accordance with an exemplary embodiment of the present invention.
Figure 2A:
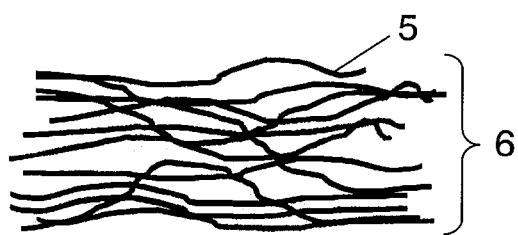
FIG. 2A to FIG. 2C are process drawings showing molding processes of a core of the vacuum heat insulator in accordance with the exemplary embodiment of the present invention.
Figure 2B:
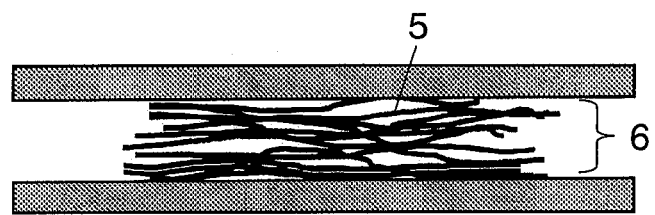
Figure 2C:
Figure 3:
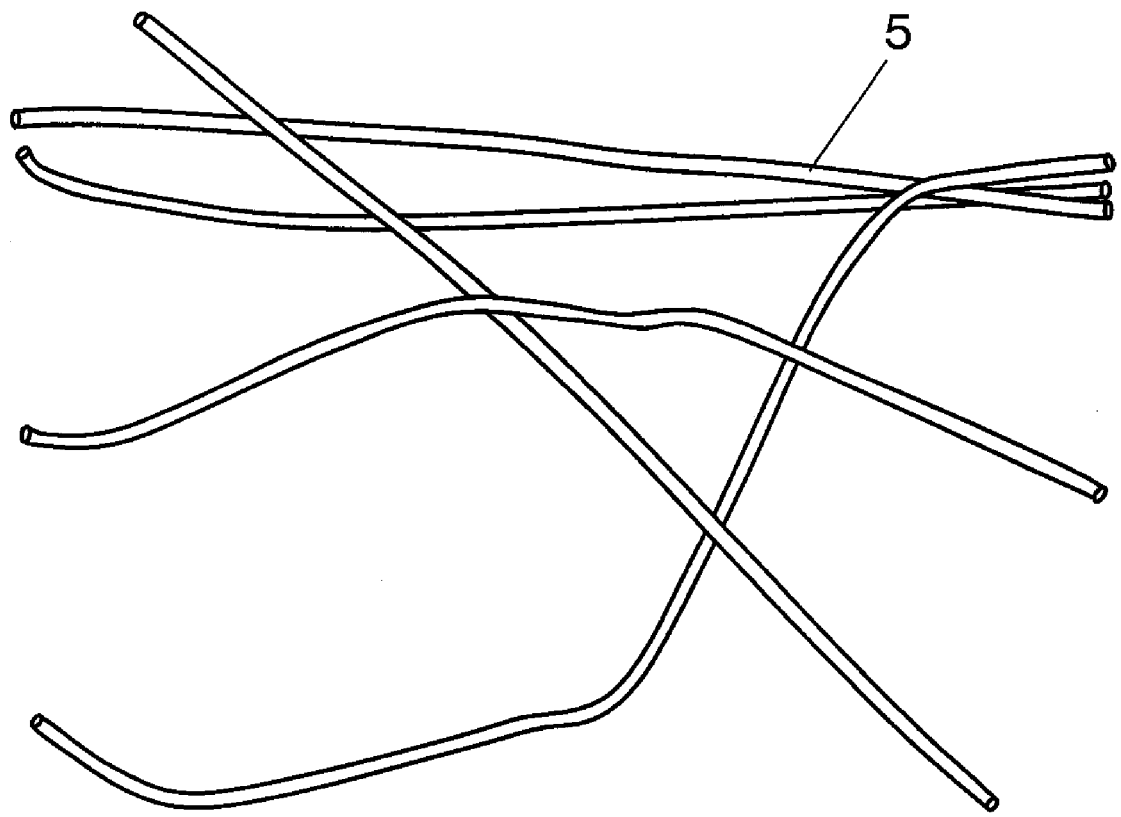
FIG. 3 is an enlarged schematic diagram of the core in accordance with the exemplary embodiment of the present invention.

FIG. 1 is a sectional view of a vacuum heat insulator in accordance with an exemplary embodiment of the present invention. FIG. 2A to FIG. 2C show a flow of molding processes of core 2 in accordance with the present embodiment. FIG. 3 is an enlarged schematic diagram of the core of the vacuum heat insulator in accordance with the present embodiment.

In FIG. 1, vacuum heat insulator 1 has core 2 and absorbent 4 that are inserted into enveloping member 3, and the inside of enveloping member 3 is evacuated.

Vacuum heat insulator 1 is manufactured as follows. First, core 2 is dried in a drying furnace at 140° C. for 30 minutes. Three sides of a laminated film are heat-sealed to form bag-like enveloping member 3. Dried core 2 is then inserted into enveloping member 3, the inside of enveloping member 3 is evacuated to 10 Pa or lower in a depressurizing chamber, and the opening is heat-sealed. Enveloping member 3 is required to have a bag shape, but the outline and seal region thereof are not limited.

Enveloping member 3 is formed of a laminated film that has a surface protective layer formed of polyethylene terephthalate film (12 µm), a intermediate layer formed of aluminum foil (6 µm), and a heat seal layer formed of straight-chain low-density polyethylene film (50 µm). As absorbent 4, calcium oxide for adsorbing moisture is employed.

As core 2, a glass fiber assembly that is formed by laminating glass wool having an average fiber diameter of 3.5 µm to a predetermined density is used. Core 2 is molded by heating and pressing for 5 minutes at 480° C. at which the initial temperature of the glass fibers is not lower than the heat deformation temperature thereof.

At this time, as the glass fibers, C glass of which alkali content is 17 wt % is used. When the viscosity temperature characteristics of the glass are analyzed by a beam bending method, the temperature of the strain point is 525° C. C glass means glass of which alkali content is at least 0.8 wt % and at most 20 wt %, and especially glass for fiber having high acid resistance.

Molding processes of core 2 are described hereinafter. FIG. 2A shows a molding process of a glass fiber assembly, FIG. 2B shows a heating and pressing process, and FIG. 2C shows a cooling process. In the molding process of the glass fiber assembly, assembly 6 where glass fibers 5 are laminated and arranged uniformly in the thickness direction is molded. At this time, fibers 5 are entangled with each other in a part of assembly 6, so that assembly 6 obtains integrity due to anchor effect. In the heating and pressing process, glass fibers 5 are heated and pressed at the heat deformation temperature. Thus, assembly 6 thermally deforms to a heated and pressed shape. In the subsequent cooling process, assembly 6 having deformed in pressing is cooled. Assembly 6 thus loses elasticity which has existed before molding and plastically deforms, and board-like core 2 having the heated and pressed shape is molded. This is caused by the anchor effect by entanglement of glass fibers 5 and by the effect by shape variation due to heat deformation of glass fibers 5. These mechanical elements make assembly 6 of glass fibers 5 have a predetermined shape and provide the integrity.

Core 2 formed of assembly 6 of glass fibers 5 is therefore kept in the predetermined shape even if there is no binding material between the fibers. FIG. 3 is an enlarged schematic diagram of the surface of core 2 produced in the above-mentioned method, and shows that there is no binding material between fibers 5.

The heat deformation temperature means a temperature at which glass fibers 5 soften and start to slightly deform due to own weight, or a temperature at which glass fibers 5 become deformable due to a vertical load in pressing. In other words, the heat deformation temperature is a temperature at which glass fibers 5 come into a soft state (viscosity-reduced state) where the sectional shapes of glass fibers 5 do not significantly vary. When glass fibers 5 are heated until the sectional shapes thereof vary, a cross-link part called a neck is formed between glass fibers 5. However, such a structure is not preferable because it reduces the heat insulation performance.

Vacuum heat insulator 1 formed in the above-mentioned method has heat conductivity of 0.002 W/mK at average temperature of 24° C., and has heat insulation performance of 10 or more times higher than that of general-purpose rigid polyurethane foam.

When the density of core 2 is lower than 100 kg/m$^3$, core 2 does not obtain sufficient rigidity to reduce its handling property, and unevenness occurs in the surface of formed vacuum heat insulator 1. When the density of core 2 exceeds 400 kg/m$^3$, the heat conductivity of vacuum heat insulator 1 increases. The density of core 2 preferably lies between 100 kg/m$^3$ and 400 kg/m$^3$. In other words, preferably, core 2 plastically deforms at a density in the range between 100 kg/m$^3$ and 400 kg/m$^3$.

Thus, vacuum heat insulator 1 having this structure has high heat insulation performance. In vacuum heat insulator 1, binding material made of the binder component or the component eluting from the fibers does not exist at the intersection point of fibers 5. Since the binding region which has conventionally worked as a thermal cross-link does not exist, the number of heat transfer points between the fibers decreases. The heat conduction in the thickness direction of core 2 is thus reduced, and the heat insulation performance is improved.

Furthermore, the effect due to drawing fibers 5 by the heat deformation of assembly 6 in heating and pressing can be expected. Therefore, the lamination arrangement of glass fibers 5 is further improved, and hence the heat resistance between fibers 5 is increased. This also improves the heat insulation performance. Since glass fibers 5 are uniformly laminated in the thickness direction, glass fibers 5 constituting molded core 2 are arranged uniformly in the thickness direction and the perpendicular direction. Therefore, the heat resistance between fibers is further increased.

The entanglement of parts of glass fibers 5 improves restrictiveness and integrity in the thickness direction to improve rigidity of core 2. The handling property of core 2 is thus improved, and the workability in the inserting process into enveloping member 3 or the like is improved. Further, the density of core 2 is easily reduced.

Since the binder component is not used, gas generated from the binder component does not occur and vacuum heat insulator 1 having small degradation over time in heat insulation performance is obtained. Since the binder component is not required in molding core 2, man-hour can be reduced and core 2 is molded efficiently.

As glass fiber 5 forming core 2, glass wool is preferably used. The glass wool is further preferable considering that it is a general-purpose industrial product, is inexpensive, and is easily handled.

Next, the handling properties of the cores depending on difference in structures thereof and the physical properties of the vacuum heat insulators using the cores are described.

In samples E1 to E4, cores are produced in a method similar to the above-mentioned method except when the densities of cores 2 are different in the range of 200 to 260 kg/m³. Vacuum heat insulators 1 are produced using cores 2. That is, glass wool that is made of C glass and has the average fiber diameter of 3.5 µm is used in cores 2, assembly 6 is formed by laminating the glass wool, and assembly 6 is compressed and molded at 480° C. At this time, binding material forming a binder is not used.

In sample E5, glass wool that is made of A glass and has the average fiber diameter of 3.5 µm is used in core 2. Since A glass is used, the molding temperature of core 2 is set at 460° C. Except for this, core 2 and vacuum heat insulator 1 are produced similarly to sample 2. The A glass also has a composition where the alkali content is at least 0.8 wt % and at most 20 wt %.

In sample E6, colloidal silica aqueous solution regulated to a predetermined concentration is stuck to the core in sample E1 and is dried to form core 2. That is, this core contains binding material for binding glass fibers.

In sample C1, glass wool that is made of C glass and has the average fiber diameter of 3.5 µm is used in the core. An assembly is formed by laminating the glass wool so that the density of the core is 220 kg/m³, sulfuric acid aqueous solution regulated to pH3 is stuck to the assembly, the assembly is compressed and dewatered, and the assembly is heated and dried to provide a predetermined shape.

In sample C2, glass wool that is made of C glass and has the average fiber diameter of 3.5 µm is used in the core. An assembly is formed by laminating the glass wool so that the density of the core is 220 kg/m³, aqueous solution of water glass regulated to a predetermined concentration is stuck to the assembly, and the assembly is compressed and molded at 480° C.

In sample C3, a core and a vacuum heat insulator is similarly produced using boric acid aqueous solution instead of the aqueous solution of water glass of sample C2.

In sample C4, glass wool that is made of E glass and has the average fiber diameter of 3.5 µm is used in the core. An assembly is formed by laminating the glass wool so that the density of the core is 220 kg/m³, and is compressed and molded at 480° C. The E glass means no alkali glass, and has a composition where alkali content is smaller than 0.8 wt %.

The molding conditions of the vacuum heat insulators and structures of the enveloping members in samples C1 to C4 are similar to those in sample E1.

Table 1 shows evaluation result of physical properties of the cores and vacuum heat insulators in these samples.

TABLE 1

| | Glass | | | Characteristic of core | | | Characteristic of vacuum heat insulator | |
|---|---|---|---|---|---|---|---|---|
| No. | Type | Strain point (° C.) | Binding material | Density (kg/m³) | Surface hardness | Handling property | Heat conductivity (W/mK) | Density of core (kg/m³) |
| E1 | C | 525 | Non | 200 | 50 | good | 0.0020 | 235 |
| E2 | C | 525 | Non | 220 | 51 | good | 0.0019 | 240 |
| E3 | C | 525 | Non | 240 | 52 | good | 0.0018 | 260 |
| E4 | C | 525 | Non | 260 | 52 | good | 0.0020 | 270 |
| E5 | A | 500 | Non | 220 | 52 | good | 0.0020 | 240 |
| E6 | C | 525 | Colloidal silica | 200 | 55 | excellent | 0.0024 | 230 |
| C1 | C | 525 | Eluting component | 220 | 51 | good | 0.0027 | 240 |
| C2 | C | 525 | Water glass | 220 | 55 | good | 0.0030 | 240 |
| C3 | C | 525 | Boric acid | 220 | 50 | good | 0.0029 | 240 |
| C4 | E | 560 | Non | 180 | 20 | bad | 0.0020 | 240 |

As obvious from Table 1, in samples C1 to C3, the cores contain binding material for binding the glass fibers. In those cases, the binding material is added before heating and molding, so that the solidified binding material and eluting component work as a thermal cross-link in the binding region of fibers and hence the heat conductivity is high.

On the other hand, the vacuum heat insulators in samples E1 to E5 using no binding material have heat conductivity of 0.0018 to 0.002 W/mK at average temperature of 24° C., and have heat insulation performance that is 10 or more times higher than that of the general-purpose rigid polyurethane foam. Further, since the binder component is not used, gas generated from the binder component does not occur, and vacuum heat insulators having small degradation over time in heat insulation performance can be provided. Since the binder component is not required in molding the cores, man-hour can be reduced and the cores can be molded efficiently.

In sample E5, A glass is used in core 2. In this case, a vacuum heat insulator having a performance similar to that in sample 2 can be obtained by setting a suitable molding temperature. In other words, the present invention is not limited by the raw material of core.

In sample C4, E glass of high strain point is used, but the core is molded at 480° C. which is the same as that for C glass. Therefore, the heat deformation of the glass fibers is insufficient, core rigidity is insufficient, and the handling property of the core presents a problem. Though the core is molded to have the density of 220 kg/m³ thereof, the laminated body of the glass fibers cannot be molded in a predetermined thickness and hence the density after the molding is 180 kg/m³. Thus, it is preferable to use the glass containing alkali in core 2, because the molding temperature is low.

Sample E6 includes binding material for binding the glass fibers in addition to the core of sample E1 that is held in a predetermined shape. As a result, the rigidity of the core is significantly increased comparing with sample E1 including no binding material. When the core requires higher rigidity, good effect is obtained.

Figure 4A:
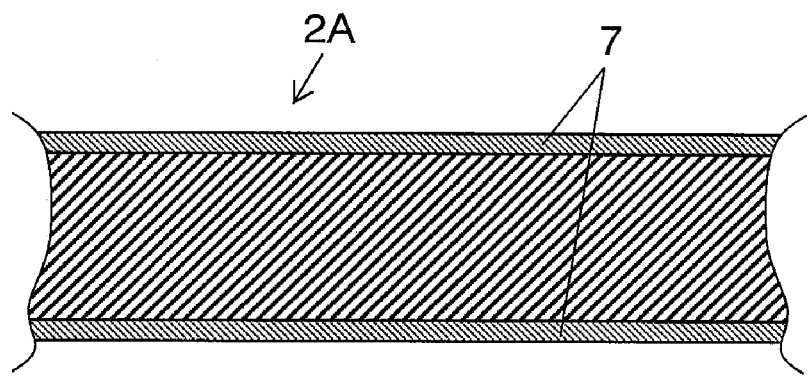
FIG. 4A is a sectional view of the core in accordance with the exemplary embodiment of the present invention.
Figure 4B:
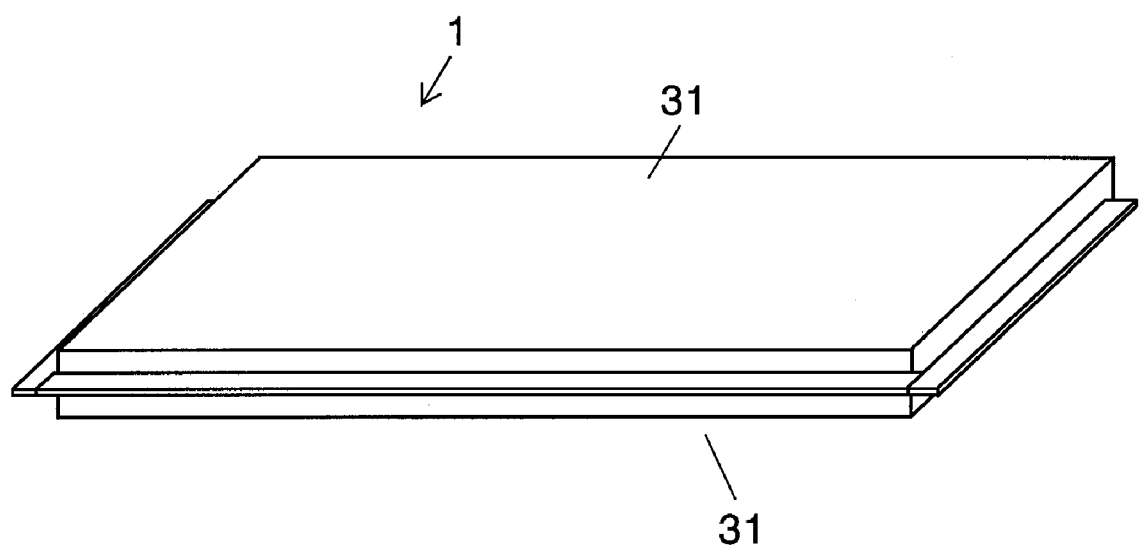
FIG. 4B is a perspective view of the vacuum heat insulator in accordance with the exemplary embodiment of the present invention.

Next, a more preferable structure of core 2 is described. FIG. 4A is a sectional view of the core in accordance with the exemplary embodiment. FIG. 4B is a perspective view of the vacuum heat insulator in accordance with the exemplary embodiment. Core 2A has smooth surface layer 7 on the outmost surface in the lamination direction of the glass fiber assembly.

When core 2A is produced, the press surface of a pressing machine that is used in heating and pressing glass fibers in the heating and pressing process is previously finished to surface roughness of Ra 25 μm or less (cut off value is 2.5 mm). Except for this, the producing method thereof is similar to that of core 2.

When glass fibers 5 are heated and compressed by the press surface having the smooth surface to be thermally deformed, a board-like core where the surface of assembly 6 of glass fibers 5 has flatness substantially equivalent to that of the surface of the pressing machine can be molded.

Smooth surface layer 7 has flatness of 2 mm or less, except for the local unevenness of the core surface, when the core size is 100×100 mm. In other words, the existence of the unevenness is not easily judged visually, and the surface lies in a non-woven fabric state.

Core 2A having smooth surface layer 7 is applied to vacuum heat insulator 1, thereby smoothing surface 31 of vacuum heat insulator 1 in FIG. 4B. Therefore, when vacuum heat insulator 1 is applied to a hot-insulation cold-insulation apparatus or the like, the sticking property is improved, and appearance failure such as deformation or distortion is not caused on the appearance surface of the hot-insulation cold-insulation apparatus.

Figure 5:
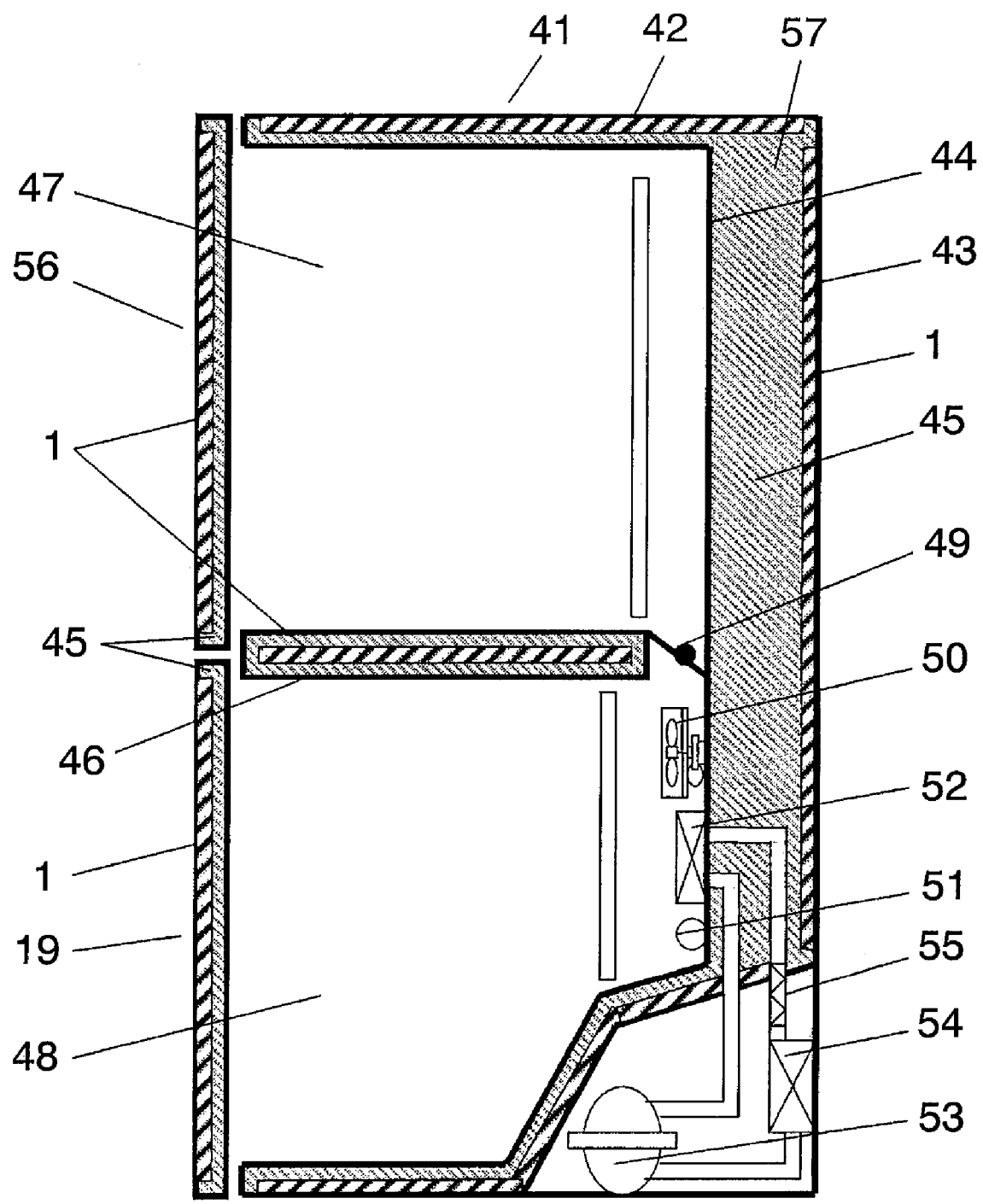
FIG. 5 is a sectional view of a refrigerator-freezer in accordance with the exemplary embodiment of the present invention.

Next, an example where vacuum heat insulator 1 having the structure as described above is applied to a hot-insulation cold-insulation apparatus is described. FIG. 5 is a sectional view of a refrigerator-freezer as one example of hot-insulation cold-insulation apparatuses in accordance with the exemplary embodiment of the present invention.

Refrigerator 41 has heat insulation box body (hereinafter referred to as "box") 42 forming a casing and a freezing cycle as a temperature regulator for keeping the temperature in box 42. Box 42 is formed of outer box 43 and inner box 44 through a flange (not shown). Outer box 43 is formed by press-molding an iron plate, and inner box 44 is formed by molding acrylonitrile-butadiene-styrene (ABS) resin or the like. Vacuum heat insulator 1 is disposed in wall part 57 of box 42. In other words, vacuum heat insulator 1 is applied to at least wall part 57. Rigid polyurethane foam 45 is foamed and filled into the space except for vacuum heat insulator 1. Rigid polyurethane foam 45 is foamed using cyclopentane as a foaming agent.

Box 42 is partitioned by partition 46. The upper part is refrigerating room 47, and the lower part is freezing room 48. Electric damper 49 is mounted to partition 46, and fan motor 50 for cooling and differential heater 51 are mounted to inner box 44 of freezing room 48.

The freezing cycle has evaporator 52, compressor 53, condenser 54, and capillary tube 55 that are interconnected sequentially annularly. Evaporators 52 may be disposed in two places of refrigerating room 47 and freezing room 48, and may be interconnected in series or in parallel to form the freezing cycle.

Doors 19 and 56 are mounted to refrigerator 41, vacuum heat insulators 1 are also disposed in doors 19 and 56, and rigid polyurethane foam 45 is foamed and filled into the space except for vacuum heat insulators 1.

In the refrigerator-freezer having this structure, vacuum heat insulator 1 has high heat insulation performance that is 10 or more times higher than that of the conventional rigid polyurethane foam, so that the heat insulation property is realized and contributes to saving the energy.

When the core of vacuum heat insulator 1 contains no binding material, inner pressure increasing by gas component generated from the binding material does not occur, thus degradation of the heat insulation performance does not occur. Therefore, the heat insulation performance does not degrade over time. Thus vacuum heat insulator 1 contributes to saving the energy continuously. The vacuum heat insulator has good surface property, hence has high mountability, so that a hot-insulation cold-insulation apparatus having high surface flatness of the box can be manufactured.

The hot-insulation cold-insulation apparatus of the present invention means an apparatus that uses heat or cold in a range of −30° C. to normal temperature or a higher temperature at which a vending machine or a hot-water supply tank is operated. Here, the range of −30° C. to normal temperature is a temperature range in which a refrigerator-freezer, a freezing apparatus, a vegetable cold-insulation box, or a rice cold-insulation box is operated. In other words, the hot-insulation cold-insulation apparatus includes a heat insulation box body and a temperature regulator for keeping the temperature in the box body. The apparatus includes not only an electrical apparatus but also a gas apparatus.

Figure 6:
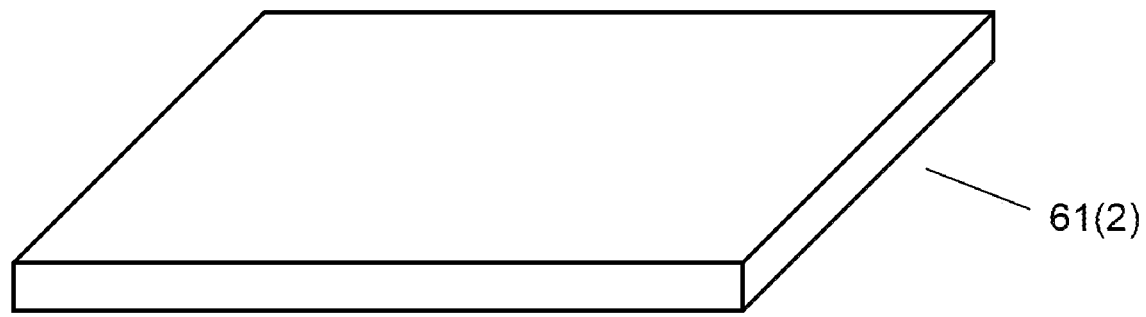
FIG. 6 is a perspective view of a heat insulation board in accordance with the exemplary embodiment of the present invention.
Figure 7:
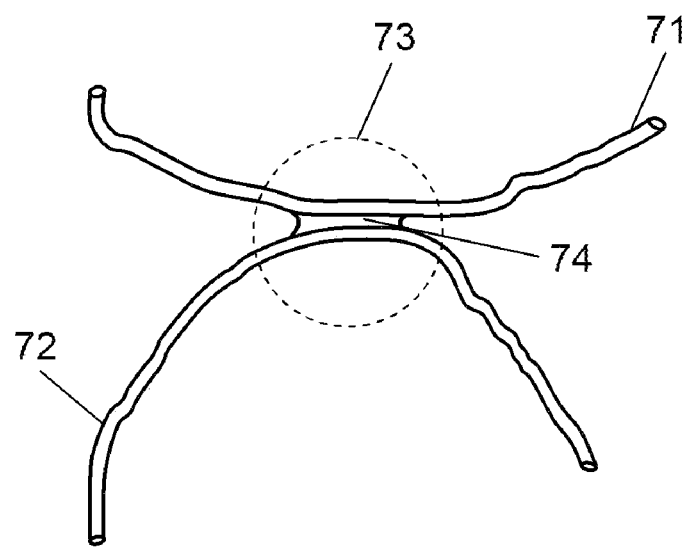
FIG. 7 is an enlarged schematic diagram of an intersection point of glass fibers in a core of a conventional vacuum heat insulator.

Next, a heat insulation board of the exemplary embodiment of the present invention is described. FIG. 6 is a perspective view of the heat insulation board in accordance with the exemplary embodiment of the present invention. Heat insulation board 61 is core 2 in vacuum heat insulator 1 as it is.

The heat insulation performance of heat insulation board 61 is 0.04 W/mK at the average temperature of 100° C., and 0.05 W/mK at 150° C. It has high heat insulation property.

Heat insulation board 61 is a molded body of glass fibers, and does not contain organic binding material, and hence can be used until about 400° C., namely heat-resistant temperature of glass fibers. In other words, heat insulation board 61 can be used with high heat resistance and high heat insulation performance. Additionally, the board rigidity is sufficient and the handling property is good.

Heat insulation board 61 has a structure where glass fibers are laminated, so that powder hardly drops from the board. When heat insulation board 61 does not contain binding material at all, a problem such as occurrence of abnormal odor or gas component in high-temperature use does not occur.

The material of glass fibers 5 is not especially limited, but glass forming oxide capable of coming into a glass state is preferable. A material having low heat deformation temperature and lamination arrangement in the thickness direction is more preferable. Glass wool is more preferable as a general-purpose industrial product because it is inexpensive and easily handled.

The diameter of glass fibers 5 is not especially specified, but it is publicly known that glass fibers having a fine diameter have high heat insulation performance. However, a conventional core having a binding region at an intersection point of inorganic fibers has sufficient heat insulation performance only when the fiber diameter is fine, namely 2 μm or smaller. In the structure of the present invention, glass fibers having a diameter of 3 μm or larger provide sufficient heat insulation performance. Therefore, even when general-purpose glass wool is used, high heat insulation performance can be secured.

As enveloping member 3, a material having gas barrier performance can be used. However, laminated film formed of a surface protective layer, a gas barrier layer, and a heat deposition layer is preferable.

As absorbent 4, calcium oxide for adsorbing moisture is employed in the above description; however, the present invention is not limited to this and various gas absorbents may be employed. For example, the gas absorbents are a physical absorbent, a chemical absorbent, and a getter agent capable of adsorbing an air component. The physical absorbent is synthetic zeolite, activated carbon, activated alumina, silica gel, dawsonite, or hydrotalcite, for example. The chemical absorbent is alkali metal, alkali-earth metal, or oxide or hydroxide of the metal, for example.

INDUSTRIAL APPLICABILITY

A vacuum heat insulator of the present invention has extremely low heat conduction in a solid component of a core, and has high heat insulation performance that is 10 or more times higher than that of conventional rigid polyurethane foam. Therefore, the heat or cold can be efficiently used in a refrigerator-freezer or a freezing apparatus, and the energy can be saved in every apparatus. The vacuum heat insulator can be used to insulate heat, shield heat, or prevent thermal damage in every object to be protected from heat or cold. The core of the vacuum heat insulator of the present invention can be used also as a heat insulation board having high heat resistance and high performance.

The invention claimed is:

1. A vacuum heat insulator comprising:
   a core formed of a laminated body where glass fibers are laminated in a thickness direction of the vacuum heat insulator,
   wherein the glass fibers contain an alkali content of at least 0.8% and at most 20% in weight, and the average diameter of the glass fibers is 3.5 µM; and
   an enveloping member covering the core and having gas barrier property,
   wherein the core is heat-pressed at a temperature of 480° C. for 5 minutes, such temperature being lower than the strain point of the glass fibers and insufficient to cross-link the glass fibers through necks formed between the glass fibers, and molded so that the laminated body has a density of 100 kg/m$^3$ to 400 kg/m$^3$, thereby a shape of the core during heat-press is kept by an anchor effect due to entanglement of parts of the glass fibers instead of binding of the glass fibers and an effect in which the glass fibers are drawn by heat deformation of the glass fibers, and the glass fibers are not cross-linked through necks formed between the glass fibers.

2. The vacuum heat insulator according to claim 1, wherein glass wool is used as the glass fibers.

3. The vacuum heat insulator according to claim 1, wherein the core is free from binding material for binding the glass fibers.

4. The vacuum heat insulator according to claim 1, wherein the core has a smooth surface layer on at least one-side surface in a lamination direction of the laminated body.

5. A hot-insulation cold-insulation apparatus comprising:
   a box body;
   a vacuum heat insulator applied to at least a wall part of the box body,
   wherein the vacuum heat insulator includes a core formed of a laminated body where glass fibers are laminated in a thickness direction of the vacuum heat insulator, the glass fibers contain an alkali content of at least 0.8% and at most 20% in weight, and the average diameter of the glass fibers is 3.5 µM;
   an enveloping member covering the core and having gas barrier property,
   wherein the core is heat-pressed at a temperature of 480° C. for 5 minutes, such temperature being lower than the strain point of the glass fibers and insufficient to cross-link the glass fibers through necks formed between the glass fibers, and molded so that the laminated body has a density of 100 kg/m$^3$ to 400 kg/m$^3$,
   thereby a shape of the core during heat-press is kept by an anchor effect due to entanglement of parts of the glass fibers instead of binding of the glass fibers and an effect in which the glass fibers are drawn by heat deformation of the glass fibers, and the glass fibers are not cross-linked through necks formed between the glass fibers; and
   a temperature regulator for keeping temperature in the box body.

* * * * *